UNITED STATES PATENT OFFICE.

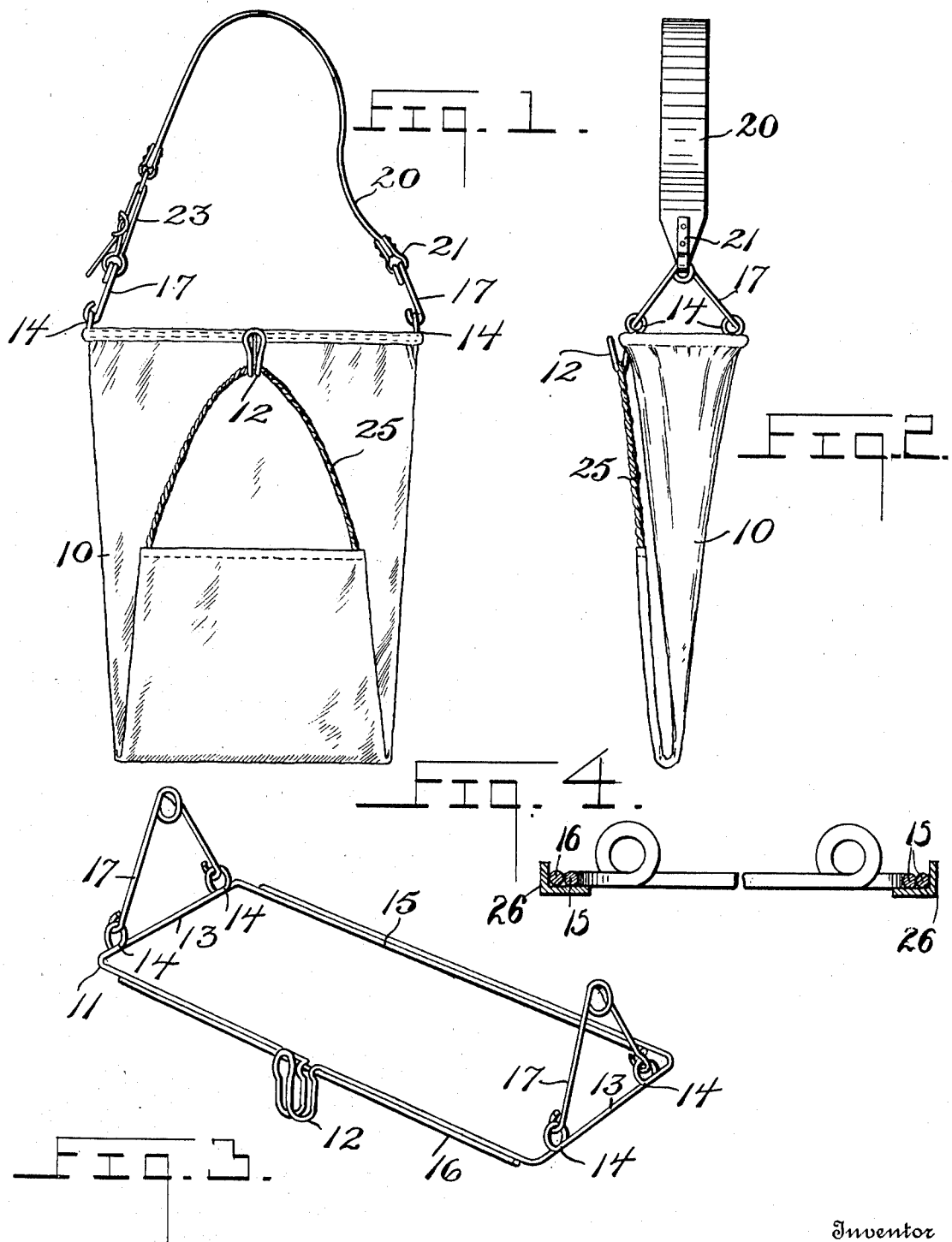

HUGH C. ALLEN, OF MAITLAND, FLORIDA.

FRUIT-PICKER'S SACK.

1,066,454.  Specification of Letters Patent.  Patented July 1, 1913.

Application filed February 11, 1910, Serial No. 543,218. Renewed May 14, 1913. Serial No. 767,720.

*To all whom it may concern:*

Be it known that I, HUGH C. ALLEN, a citizen of the United States, residing at Maitland, in the county of Orange and State of Florida, have invented certain new and useful Improvements in Fruit-Pickers' Sacks, of which the following is a specification.

This invention relates to fruit harvesting appliances, and more particularly to an improved form of sack or pouch adapted to be carried upon the shoulder of a fruit picker conveniently for the collection of fruit therein, and particularly adapted for the discharge of fruit therefrom without removal from the operator's shoulder, and with the expenditure of a minimum amount of time and labor.

Another object is also to minimize the damage to fruit through bruising when removing from the bag and disposing in shipping receptacles.

Another object is to provide a bag having an open lower end and means for closing the lower end in a convenient manner and adapted to be manipulated by the operator without undue effort and without removal of the bag from the operator's shoulder.

A further object has been to provide a novel form of frame upon which to support the bag and secure the closure means.

Other objects and advantages will be apparent from the following description, and it will be understood that changes in the specific structure shown and described may be made within the scope of the claim without departing from the spirit of the invention.

In the drawings: Figure 1 is a detail side view of the bag alone, Fig. 2 is a similar end view, Fig. 3 is a detail perspective view of the top frame for the bag, Fig. 4 is a cross section of the formation showing the modification thereof.

Referring to the drawings, there is shown a bag 10 formed of suitable tough fabric such as canvas or the like, somewhat in the form of an inverted truncated cone, the upper edges being hemmed and engaged over a suitable metal frame 11. The frame as shown is formed of wire, rectangular in shape, but one piece of wire being used for the complete frame. The central portion of one side is bent downwardly to form a connecting hook or resilient loop, the outer end portion of which is turned upwardly to form a hook 12. Adjacent each corner and formed in the respective end portions 13 there are eyes 14 each comprising a helix formed in the wire during bending process and extending transversely with respect to the frame. The opposite end portions of the wire are overlapped as shown at 15, forming the rear side of the frame and reinforcing this side, which is subjected to considerable strain during use, so that its bending will be obviated as far as possible. The edges of the bag are turned inwardly over the ends and sides of the frame and stitched closely therearound, and on the front side of the frame an additional length of wire 16 is inclosed in the hemmed portion of the bag to reinforce the front edge of the frame. If desired, a small piece of L-shape angle iron 26 may be disposed at the forward and rear sides of the frame, whereby these will be more rigidly braced against bending as illustrated in the modification shown in Fig. 4. Engaged in the eyes at respective ends of the frame, there are two bail members 17 also formed integrally from wire and comprise V-shaped members having a helical eye formed inwardly thereof the arms extending at a tangent from the outer side of the eye, and the extremities of the opposite arms having hook portions formed therein engaged in the opposite eyes at each end. For engaging the device upon the shoulder of an operator, a broad strap 20 of suitable material is utilized having a suitable strap eye 21 at one end engaged through the eye of one of the bail members, and carrying a ring at the opposite end through which is engaged the end of an adjustable strap 23 which is also engaged through the eye of the remaining bail member.

The lower end of the bag 10 is but slightly less in width than the top, and has secured to its opposite side the operating loop 25, which normally is looped over the hook 12, by which the lower portion of the bag is bent upwardly to a point approximately one-third of its length, the fold thus made preventing the escape of fruit therefrom when in use.

What is claimed is:

A fruit picking sack, comprising a bag open at both ends, a frame secured in one end of said sack and comprising a piece of wire bent into rectangular form, the ends of said wire extending approximately the entire length of one of the longer sides thereof and parallel to each other, the opposite side of said rectangle being centrally looped, said loop being bent into the form of a depending hook, outwardly projecting curved portions between the hook and the adjacent side of the rectangle, the end portions of the rectangle being formed with spaced integral eyes, strap engaging means comprising strips of wire coiled at their central portions and provided with hooks on their opposite ends for engagement in the eyes, and an independent strip of wire disposed in parallel relation with the hook side of the rectangle with the same amount of rigidity as the opposite side, an L-shaped frame adapted to receive the said rectangular frame, and means on the opposite end of the bag for engagement with said hook for holding the bag in closed position, said curved portions co-acting with the hook to retain said means in engagement with the hook.

In testimony whereof I affix my signature, in presence of two witnesses.

HUGH C. ALLEN.

Witnesses:
FRANK W. ALLEN,
B. A. GALLOWAY.